(12) United States Patent
Deschenes

(10) Patent No.: US 7,567,813 B2
(45) Date of Patent: Jul. 28, 2009

(54) METHOD AND SYSTEM FOR AUTOMATICALLY PROVIDING HANDSET OPERATIONAL STATUS INFORMATION TO A WIRELESS CARRIER

(76) Inventor: Michel Deschenes, 525 de la Métairie, Montreal, Quebec (CA) H3E 1S4

( * ) Notice: Subject to any disclaimer, the term of this patent is extended or adjusted under 35 U.S.C. 154(b) by 0 days.

(21) Appl. No.: 10/498,910

(22) PCT Filed: Dec. 18, 2002

(86) PCT No.: PCT/CA02/01935

§ 371 (c)(1),
(2), (4) Date: Jun. 5, 2005

(87) PCT Pub. No.: WO03/053085

PCT Pub. Date: Jun. 26, 2003

(65) Prior Publication Data

US 2006/0046750 A1    Mar. 2, 2006

(30) Foreign Application Priority Data

Dec. 18, 2001    (CA) .................................... 2365559

(51) Int. Cl.
*H04Q 7/20*    (2006.01)
(52) U.S. Cl. ................ 455/456.6; 455/435.2; 455/432.3
(58) Field of Classification Search ............. 455/550.1, 455/557, 556.1, 554.2, 41.1, 412, 456.6
See application file for complete search history.

(56) References Cited

U.S. PATENT DOCUMENTS

| | | | |
|---|---|---|---|
| 1,250,360 A | 12/1917 | Schaffer | |
| 4,658,096 A | 4/1987 | West, Jr. et al. | |
| 4,775,997 A | 10/1988 | West, Jr. et al. | |
| 4,887,290 A * | 12/1989 | Dop et al. | 379/33 |
| 4,992,517 A | 2/1991 | Tazi et al. | |
| 5,469,494 A | 11/1995 | Ortiz Perez et al. | |
| 6,760,601 B1 * | 7/2004 | Suoknuuti et al. | 455/557 |
| 6,778,824 B2 | 8/2004 | Wonak et al. | |
| 6,850,758 B1 * | 2/2005 | Paul et al. | 455/422.1 |
| 7,372,955 B1 * | 5/2008 | Ryder et al. | 379/221.14 |

(Continued)

FOREIGN PATENT DOCUMENTS

| | | |
|---|---|---|
| DE | 198 03 019 A1 | 8/1998 |
| DE | 100 14 677 A | 9/2001 |
| EP | 1146701 A1 | 10/2001 |
| WO | WO 97/43864 A | 11/1997 |
| WO | WO 98/47300 A | 10/1998 |
| WO | WO 01/69959 A | 9/2001 |

*Primary Examiner*—Alexander Eisen
*Assistant Examiner*—Eric Elcenko
(74) *Attorney, Agent, or Firm*—Benoît & Côte, s.e.n.c.

(57) ABSTRACT

Discloses a system to provide cellular handset operational status information to wireless carriers relating to insertion or proximity of mobile cellular handsets to a hybrid fixed wireless interface (HFWI) device. Upon handset coupling to a HFWI, by insertion of the handset into a receiving connector on the HFWI or proximity of the handset to the HFWI, the system controls the handset to update the signalling protocol to inform the wireless carrier of an interfaced and operational operation mode. In an alternative arrangement upon handset coupling to the HFWI, the HFWI instructs the handset to transmit an interfaced and operational mode of operation message to the wireless carrier. In a preferred embodiment upon removal of the handset from the HFWI, or the handset being taken out of reach of HFWI proximity sensing, the system reverts to the conventional signalling protocol indicating a non-interfaced (mobile) operation mode to the carrier.

6 Claims, 6 Drawing Sheets

U.S. PATENT DOCUMENTS

2001/0049274 A1 12/2001 Degraeve
2004/0152482 A1* 8/2004 Raffel et al. ................ 455/522
2004/0204845 A1* 10/2004 Wong ......................... 701/210
2005/0255880 A1* 11/2005 Inoue ....................... 455/552.1

* cited by examiner

METHOD AND SYSTEM FOR AUTOMATICALLY PROVIDING HANDSET OPERATIONAL STATUS INFORMATION TO A WIRELESS CARRIER

FIELD OF THE INVENTION

The present invention relates to telecommunications and more particularly relates to a method and system for providing cellular handset operational status information to a wireless carrier network.

BACKGROUND OF THE INVENTION

Products currently exist which allow the interfacing of wireless and mobile wireless networks with conventional fixed telephone sets. For example, as described in U.S. Pat. Nos. 4,775,997 and 4,658,096 to West Jr. et al. Such products are marketed under various brand names and are commonly known as a Fixed Wireless Interface (FWI). Typically installed in residential homes, in areas where conventional telephone service is difficult to obtain, FWIs can also for example be installed on boats, SUVs, mobile homes, or anywhere that conventional telephones need to operate on the Public Switched Telephone Network (PSTN) and access to a wireless carrier network service (typically a PCS carrier) is available. The said products interface with conventional phones to provide dial tone, ringing, and conventional dial out capabilities, with access to the PSTN via a wireless connection to a wireless carrier network through the FWI's radio transceiver.

German patent application publication DE19803019 by Euscher provides a wireline PSTN access for a wireless phone subscriber. In the apparatus of Euscher, upon insertion of the wireless handset in a cradle, the phone changes modes to act as a wireless phone linked to the PSTN via conventional landline connectivy from a local residential base. This arrangement converts a wireless phone access to a wireline phone access.

Some manufacturers have recently developed what can be called Hybrid Fixed Wireless, Interfaces (HFWI) aka. cellphone-fed fixed/mobile interfaces or docking stations. Compared to conventional FWIs, where the radio transceiver is normally an integral part of and contained in the interface device, an HFWI features a transceiver which can be separated manually by the user from the interface device. This is because the radio transceiver is typically a conventional mobile cellular phone, rather than a radio transmitter and receiver device enclosed in a packaged unit. The portable mobile cellular phone can be freely coupled or uncoupled by the user to and from the HFWI through the physical placement of the mobile telephone handset on the HFWI, which also serves the purpose of a battery charger, with electrical connectors on the mobile telephone handset mating to electrical connectors on the HFWI. A form of such an arrangement is described in the International application WO 01/89959A1(IPR IND LTD; MARTENSSON NILS (GB) (2001 Sep. 20) However the description does not disclose any treatment afford to incoming calls received on the mobile cellular phone while it Is inserted in the docking station and as such does not satisfy the bi-directional call placement and reception capabilities of true HFWI. It discloses the docking station ability, on a call by call basis, to intercept outbound calls initiated on fixed or cordless telephones connected to it, and to direct such call through either the wireless mobile phone access or the wireline copper pair access. It also describes on an outbound call by call basis, that the docking station could have the ability assuming an outbound interception favorable to the mobile phone and system operator, to inform the operator of such an occurrence for the purpose of applying a different tarriff to that particular outbound call. Other applications such as the German application DE 100 14 677 A(BUECKERT SVEN) (2001 Sep. 20) or international application WO98/47300 CHEW,MOH,JIN (1997 Nov. 20) disclose docking stations that have bi-directional call placement and reception abilities, the first being capable of wireless interfacing between mobile cellular phones and analog fixed type phones and the latter electrical interfacing, both representing a more complete definition of HFWI.

HFWIs are typically intended to be placed In residential homes and/or SOHO (small office/home office) locations in order to allow conventional fixed telephone sets coupled to them to operate in a fashion similar to conventional fixed telephony conditions, while actually reaching the PSTN through wireless carrier network access. This is achieved through the Insertion of a cellular wireless handset in the HFWI, the cellular wireless handset communicating with the HFWI via a dataport (i.e. a communications interface).

Two drawbacks of currently available HFWIs which have slowed down considerably their acceptance and endorsement by wireless access carriers and, hence, the general public. Current HFWIs do not allow wireless carriers to adjust or customize billing and the type and quality of the carrier services provided to a customer based on the use of a handset in a fixed interfaced mode in conjunction with a HFWI. Also, currently available HFWI require various software and physical and electrical connectivity variations to pair cellular handsets to HFWIs.

SUMMARY OF THE INVENTION

An HFWI usually operates using narrowband spectrum cellular interfaces and at various frequencies relative to the territory covered and licenses obtained. However, for the purpose of this disclosure, the term HFWI also applies to any wireless radio product including broadband capable products as long as the user can separate the radio transceiver from the HFWI and where that radio takes the form of a cellular telephone (for example, a PCS mobile communication handset).

It is one objective of the present invention to overcome the above and other drawbacks by providing the means to determine the use of a cellular telephone handset having fixed interfaced operational status and inform the wireless carrier network of this status. On the reception of information related to the fixed interfaced operational or mobile status, the wireless carriers will be in the position to provide enhanced network services to the end user. It will allow elegant, feature-rich and cost-effective utilisation of mobile handsets when used in an interfaced operational mode of operation, interfacing conventional telephones or telephone-like equipment. In turn, it will allow wireless carriers to make a sound and profitable customer offering. In addition, it will allow compatible wireless local connectivity between a HFWI and a cellular handset equipped with a local wireless dataport.

In particular, the present invention overcomes the above drawbacks by providing an apparatus and method for automatically informing a wireless carrier network when a cellular telephone handset is in an interfaced operational mode or mobile mode. Identification of the handset in fixed interfaced operational mode allows the wireless carrier to provide the following value propositions:

Fixed price plan capped to a maximum monthly of usage on fixed operational mode;

Bundled pricing of voice and internet service on fixed operation mode;

Positive location identification for 911 emergency calls in fixed operational mode;

Automatic long distance dialling capability and preferential long distance pricing in fixed operational mode;

Conventional (non mobile) network switch traffic management in fixed operational mode;

Adjusted network build plan to more precisely accommodate high density traffic areas; and Any other customer value proposition or carrier cost control measure on the part of the wireless carrier.

DETAILED DESCRIPTION OF THE PREFERRED EMBODIMENT

According to a preferred embodiment of the present invention, a variety of wireless access devices and technologies are considered. Some descriptions may refer to solutions available under the guidance of the Global System for Mobil (GSM) communications technology standard. It will be apparent to one of ordinary skill in the art that the present may refer to other wireless standards such as AMPS and NAMPS in analog cellular, TDMA or CDMA in PCS or other European standards including broadband standards, provided the intent is to inform the carrier or a third party about the fixed interfaced or mobile operating status of a mobile telephone handset when it is inserted into (interfaced with) or extracted out of (not interfaced with) a hybrid fixed wireless interface (HFWI) device. For example, the invention described may serve the purpose of driving the Network Interface Unit (NIU) device type status indication (fixed, limited mobility or full mobility) which would allow messaging on the wireless interface as described in CDMA standards ANSI-95 and IS-2000 in the wireless local loop feature intended to provide wireline-like service to end users.

Figures 1, 1A:
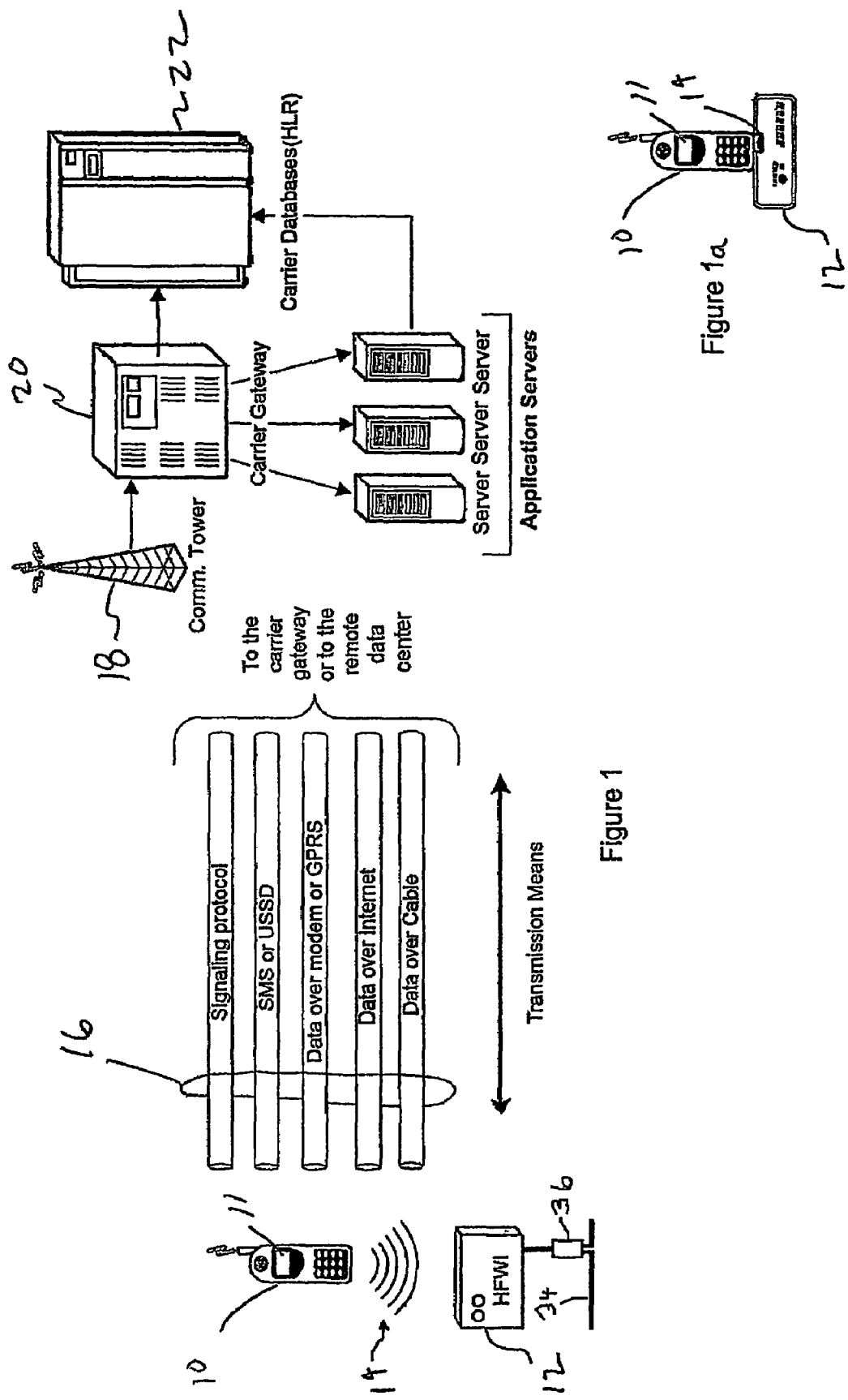
FIG. 1 is a schematic diagram of the components of a PCS wireless system in accordance with a preferred embodiment of the present invention.
FIG. 1a shows an alternate embodiment of the dataport of FIG. 1.

Referring now to FIG. 1, as explained generally above, in a preferred embodiment the portable cellular handset 10 is placed in the HFWI 12 (which jointly form part of the "System"), which results in the following actions occurring:

1. Identification and functional information is exchanged between the handset and the HFWI via a dataport 14.
2. The HFWI 12 or cellphone-fed fixed/mobile interface of the System senses the fixed interfaced operation mode of the handset.
3. The HFWI 12 or cellphone-fed fixed/mobile interface of the System instructs the handset 10 to update the handset signaling protocol to be used over transmission means 16 so as to automatically and autonomously inform the wireless carrier network upon the next exchange of information through a signaling protocol request, that the handset is in fixed interfaced mode of operation, or the HFWI 12 or cellphone-fed fixed/mobile interface of the System instructs the handset 10 to automatically and autonomously transmit to the wireless carrier 18 or a clearing house gateway 20 the result of action above i.e. information containing identification and functional status (fixed mode or mobile mode) of the handset. This information authenticated locally or remotely 22 would serve the purpose of informing wireless carriers that the handset is in an interfaced operational mode of operation.
4. After action 3 above, the HFWI 12 or cellphone-fed fixed/mobile interface of the System instructs the handset to follow a routine which, upon extraction of the handset from the HFWI, will allow the handset to update locally the handset signalling protocol so as to automatically and autonomously inform the wireless carrier upon the next exchange of information through a signalling protocol request that the handset is no longer in an interfaced operational mode of operation, or After action 3 above, the HFWI 12 or cellphone-fed fixed/mobile interface of the System instructs the handset to follow a routine which will allow, upon removal of the handset 10 from the HFWI 12, the handset to transmit to the wireless carrier 18 or a clearing house 22, information containing identification and functional status (fixed mode or mobile mode) of the handset 10. This information, authenticated locally or remotely at 22, would serve the purpose of informing wireless carriers that the handset is no longer in an interfaced operational mode of operation.
5. Optionally, the handset battery is charged.

Figure 3:
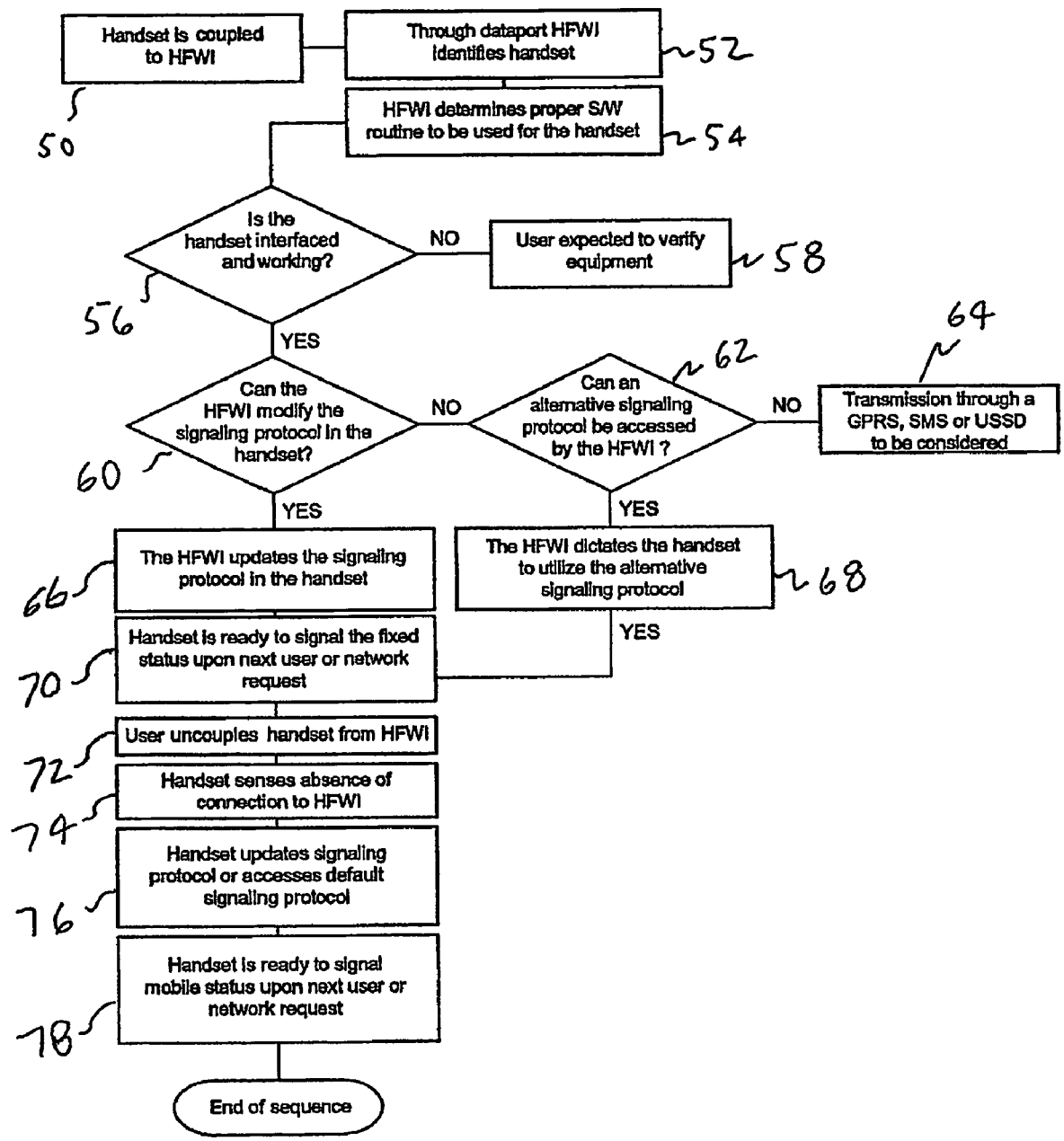
FIG. 3 is a flow chart of the autonomous transmission of interfaced and operational handset operation in accordance with a preferred embodiment of the present invention using signalling protocol.
Figure 4:
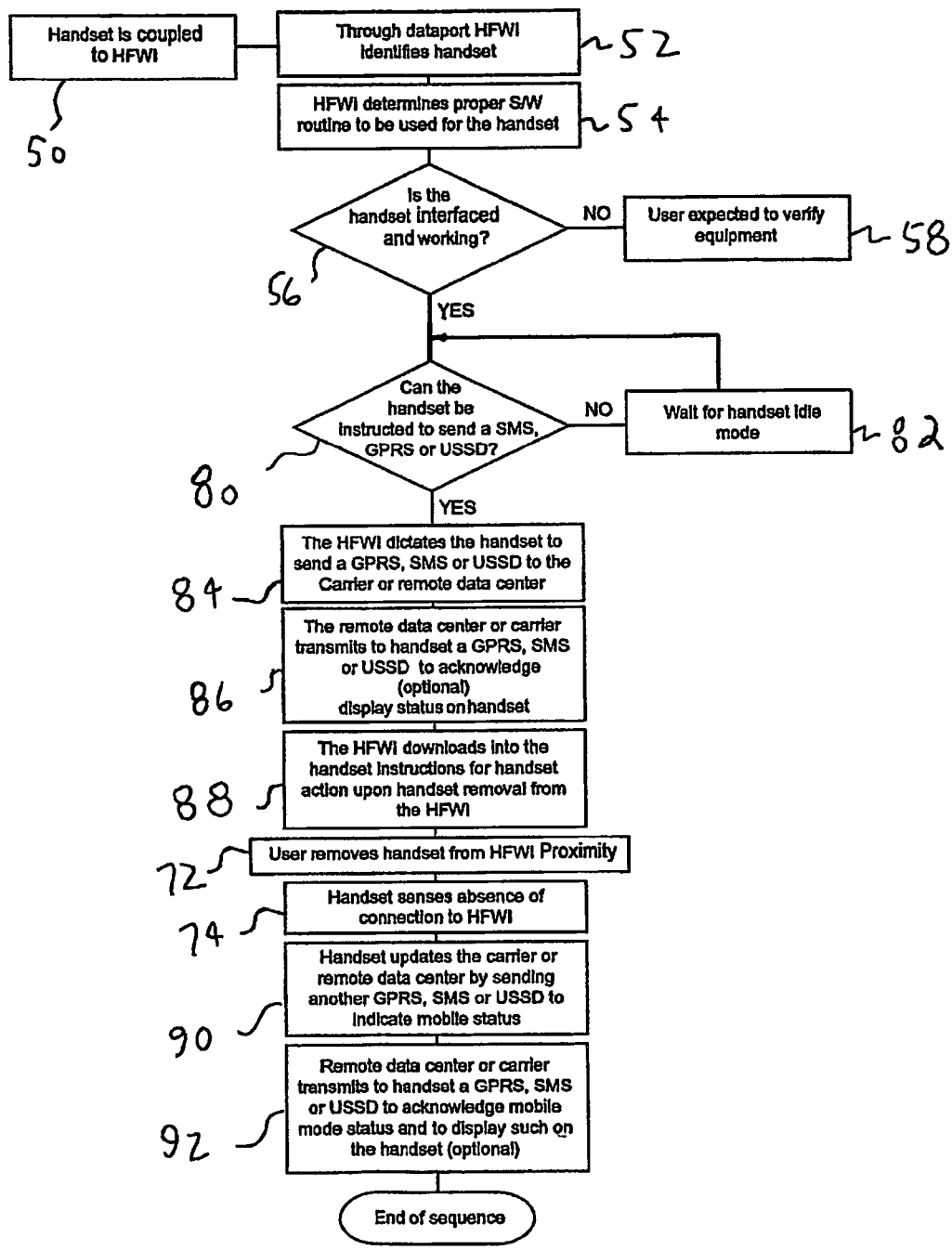
FIG. 4 is a flow chart of the autonomous transmission of interfaced and operational handset operation in accordance with an alternative embodiment of the present invention using GPRS, SMS or USSD.

A flow chart disclosing a preferred sequence of system operation for signalling protocol based method is provided at FIG. 3 and a flow chart disclosing a preferred sequence of operation for a SMS (Short Messaging Service), USSD (Unstructured Supplementary Service Data) or GPRS (General Packet Radio Service) based method is provided at FIG. 4. USSD is a Global System for Mobile (GSM) communication technology that is used to send text between a mobile phone and an application program in the network. Applications may include prepaid Roaming or mobile chatting. USSD is similar to Short Messaging Service (SMS), but, unlike SMS, USSD transactions occur during the session only. With SMS, messages can be sent to a mobile phone and stored for several days if the phone is not activated or within range. Reference can be made to the provided flow charts during the discussion of the system operation below.

System Control Location

Throughout the present description, the system refers to software and hardware components where the control may be distributed between handset, the HFWI and the gateway present in the carrier network or at a remote clearing house. It should be apparent to one of ordinary skill in the art that the location of the control in the system may vary depending on the mode of implementation and therefore a given choice of the location of the control is within the scope of the present invention.

Handset Identification Upon Proximity Sensing or Insertion in the HFWI

Initially, the handset makes physical or radio contact with the HFWI, which detects mechanically, electrically or electronically the handset's presence. The detection of the presence of the handset to the HFWI is effected by the dataport 12. The dataport 14 is preferably a wireless coupling between the handset 10 and the HFWI 12 as shown in FIG. 1. FIG. 1a shows an alternative embodiment of the dataport 14 being a physical electrical connection coupling the handset 10 to the HFWI. Upon detection, the HFWI then proceeds to identify the handset by reading through the dataport 14 one or more unique identifiers, which may be an electronic serial number, the handset identity, or other identifier. The goal of these actions is the identification of the handset 10 by the HFWI 12 in order to allow the HFWI to proceed to utilise a proper software routine to:

1. Determine whether or not the System (handset and HFWI) is in a interfaced and operational mode working condition; and
2. Instruct the handset on the appropriate action to be taken in order to inform the wireless carrier network of the condition determined in 1.

HFWI to Handset Instructions

In the preferred embodiment, the System inside the HFWI 12 prompts the handset 10, through the dataport 14, to update a flag in the air interface signalling protocol over transmission means 16 indicating to the wireless carrier network that the handset has entered the interfaced operational mode of operation. Alternatively, the air interface signalling protocol over transmission means 16 indicates an interfaced operational mode of operation may have been pre-programmed in the handset 10 as a second signalling protocol and may be resident in the handset together with a first signalling protocol meant to indicate a mobile mode of operation. Processing inside the HFWI would select the appropriate signalling protocol to be used by the handset after interfaced operational fixed or mobile status or mode is determined. An indication as to the correct signalling protocol to be used would be transmitted to the wireless carrier network automatically during normal updates transmitted between the handset and wireless carrier network 18 over transmission means 16.

Figure 2:
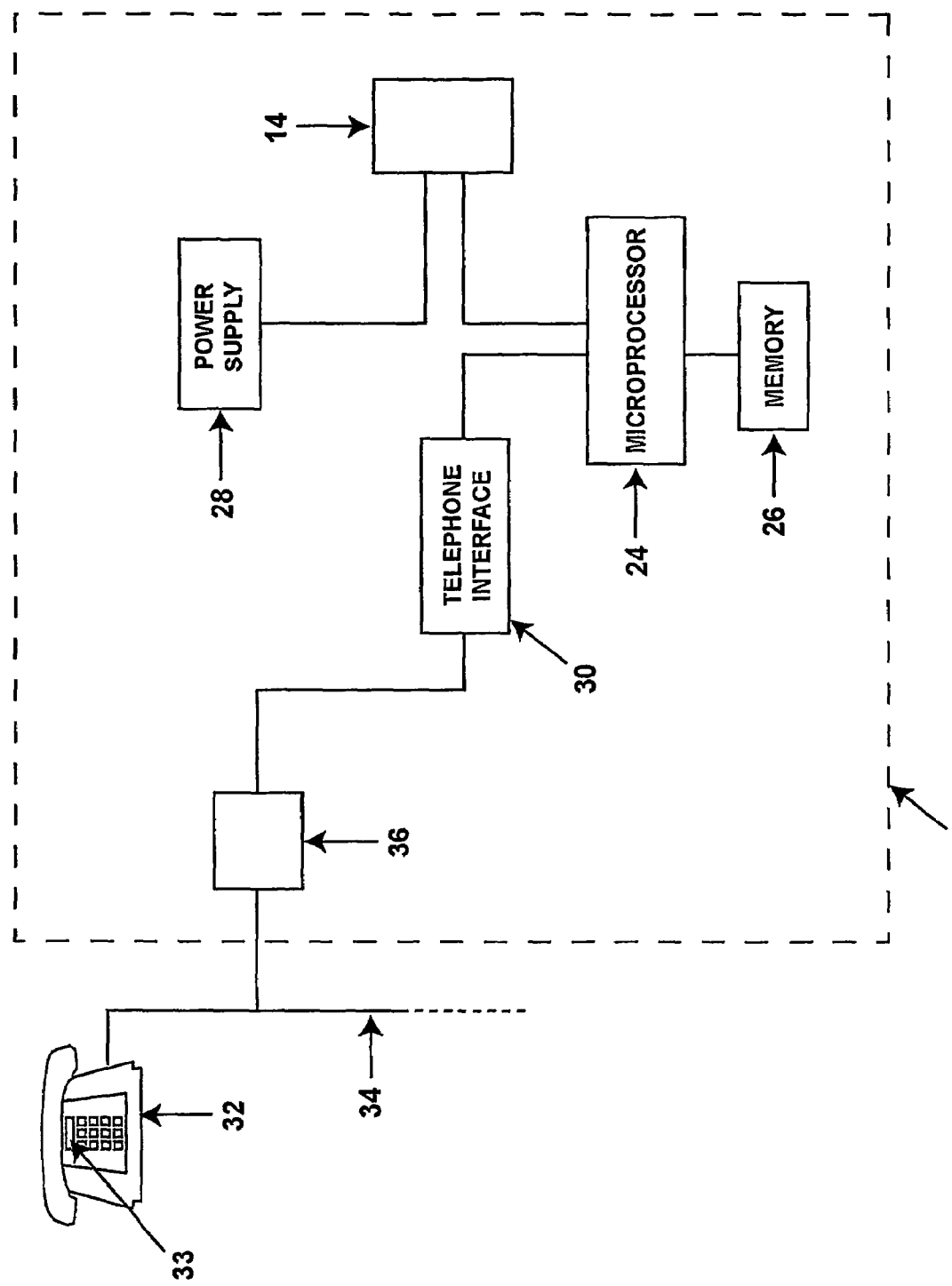
FIG. 2 is a functional block diagram of an embodiment of a hybrid fixed wire interface (HFWI)

FIG. 2 shows a functional block diagram of a handset fixed wireless interface 12. A dataport 14 is provided to couple the HFWI 12 with a handset as more particularly described herein. Preferably the dataport implemented is a wireless interface between the HFWI and a cellular handset using radio technology, using appropriate protocols, for example such as the Bluetooth (trademark) standard. A wireless dataport provides for interoperability between a broad range of cellular handsets and an HFWI without the need to special engineer a mechanical and electrical coupling to support the interconnection of an HFWI to a particular handset. Alternately, the dataport 14 can be implemented as a physical wired connection between HFWI 12 and the handset 10 as shown in FIG. 1a. One advantage of a physical wired connection is that a handset battery recharging supply can be provided in the HFWI to permit the battery of the handset 10 to be recharged when the handset is coupled to the HFWI.

The HFWI system operation is controlled by a microprocessor 24. Microprocessor 24 operates under instructions from a program memory 26, which can include a fixed read-only memory (ROM) module to record the memory instructions and preserve them in the event that the power supply (not shown) to the HFWI is interrupted. For example, during shipping and storage in distribution to the consumer or a power interruption or relocation of the HFWI within the user's premises. Memory 26 also includes random access memory (RAM) to hold status and state information during operation of the HFWI and its interaction with the components to which it is attached. A power supply 28 is provided as an option to permit recharging of a handset 10, when it is coupled to the HFWI 12 using the dataport configuration of FIG. 1a, to permit the battery within the handset 10 to be recharged. Naturally if the handset is in wireless communication with HFWI, when it is coupled to the HFWI 12 using the dataport configuration of FIG. 1, then the power supply would not be connected to the handset to recharge the batteries.

A premises telephone interface 30 provides a necessary signalling required to operate premises telephones 32 such as ring current for inbound calls and dial tone for outbound calls etc. Premises telephones 32 are deployed on the premises wire line telephone distribution cabling 34 to which the HFWI is coupled by a telephone connector 36. The telephone connector 36 can, for example, be a conventional telephone RJ-11 jack.

FIG. 3 shows a process flow carried out by a microprocessor 24 in conjunction with the processor controlling the handset 10 to establish a signalling protocol to implement the arrangement of the invention. When the handset is inserted into or made proximate to the HFWI as denoted by process box 50 the dataport 14 is used to identify the handset 10 to the HFWI as denoted by process box 52. As the HFWI is intended to be used with a plurality of handsets manufactured by a plurality of manufacturers, the control process within the HFWI will determine the proper software routine to be used for the identified handset as denoted by process box 54. If the handset is one that is recognized by the HFWI the handset interoperation with the HFWI is tested as denoted by the decision control box 56. If a co-ordination or interoperation between the handset 10 and HFWI is not possible, the process terminates with the user being expected to verify that the equipment is compatible and interoperable with the HFWI as denoted by termination block 58. If a recognized and compatible handset is placed into or made proximate to the HFWI, then the known handset parameters are tested to determine if the HFWI can modify the signalling protocol of the handset as denoted by decision box 60. If no modification or update of the handset signalling protocol is possible, then the handset is assessed for alternate signalling protocols to determine if they are available as denoted by decision block 62. If alternative signalling protocol is not possible, then the HFWI cannot interoperate with the handset and consideration must be given to transmission through a GPRS, SMS or USSD protocol as indicated by termination block 64.

Returning to decision box 60, if the HFWI can control or modify the signalling protocol of the handset, then the HFWI updates the signalling protocol in the handset as denoted by process box 66. Alternately, if an alternate signalling protocol can be accessed by the HFWI, then the HFWI dictates the handset to utilise the alternative signalling protocol as denoted by process box 68. In either event, the handset is then prepared by the HFWI to signal the fixed status to the carrier network upon the next user or network request. This handset state is shown by process box 70.

Communications can now occur between the wireless carrier network and the handset 10, which will be made available to the local wireline telephone distribution 34 as shown in FIG. 2 via the interoperation of the handset 10 and HFWI 12. When the user actually removes the handset from proximity to the HFWI as denoted by process box 72, the event is detected as indicated by process box 74. This event causes the handset to update the handset network signalling protocol or to access an alternate signalling protocol, as denoted by process box 76. When the necessary exchange of messages with wireless carrier network occurs, the handset is ready to signal its mobile status to the wireless carrier network on the next user or network request as denoted by process box 78.

FIG. 4 shows a process flow control for the autonomous handset transmission of fixed handset operation status using a GPRS, SMS or USSD method. Similar process steps in the flow chart of FIG. 4 are provided with like reference numerals to the process described with reference to FIG. 3. Once the preliminary steps of interaction between the HFWI 12 and handset 10 have occurred as shown in process boxes 50, 52, 54, 56 and 58, the HFWI performs the test at process box 80 to determine if the handset can be instructed to send an SMS, GPRS or USSD message. If the handset is not available to send such a message, the HFWI performs another loop to wait for the handset to enter an idle mode, the loop being depicted by process box 82 in the flow chart arrangement shown between decision box 80 and process box 82.

When the handset is available to send an SMS, GPRS or USSD message, the HFWI communicates with the handset to send the appropriate message to the carrier remote data center as denoted by process box 84. An acknowledgement is returned to the handset 10 and receipt of the acknowledgement message may be displayed on the display area 11 provided in the handset 10. As denoted by process box 86 the exchange of these messages with a wireless carrier indicates that the carrier has now recorded an interfaced operational mode or state for the cellular phone thus enabling carrier selected services to facilitate and support the fixed wire interface interoperating with the cellphone 10. At entry to this state, the HFWI downloads into the handset via dataport 14 the appropriate instructions for the handset to take upon removal of the handset from the HFWI as shown by process box 88. When the user uncouples the handset from the HFWI denoted by process box 72, for example when the user removes the handset from proximity to the HFWI, the absence of the coupling with the HFWI will be sensed as denoted by process box 74. At this point in time, the handset 10 will update the carrier or remote data center by sending another GPRS, SMS or USSD message to the carrier to indicate the mobile status as shown by process box 90. In a preferred arrangement, the remote data center or carrier control will respond by transmitting an acknowledgement message to the handset to confirm that mobile status has been recorded for the handset as denoted by process box 92.

Handset Software

It may be convenient to provide additional functions within the handset to allow some local and remote authentication, status display etc. Also, upon handset extraction from proximity to the HFWI the handset is used in a mobile mode of operation. One HFWI and handset interoperation functionality is the ability to sense handset removal. For example, the absence of heartbeat signal between handset and HFWI, or the absence of charging power or simply the absence of local wireless connectivity, for example the loss of a Bluetooth (trademark) bond between the handset and the HFWI. Upon loss of interoperation functionality, that is, upon handset removal, a mobile status mode update message must be provided to the wireless carrier. The functionality required to provide the message to the wireless carrier may be implemented in either of several different ways. In one implementation, the functionality is provided in the form of software that is downloaded into the handset. Another implementation provides a temporary update and default setting of the signalling protocol. In another implementation, the functionality is preprogrammed into the telephone firmware or, in yet another implementation, the functionality is included in a Subscriber Identity Module (SIM) card (GSM only) at the time of subscription to the fixed wireless service. Such implementations either for sensing local interfacing status or for sending remotely the interfaced status are contemplated by and are within the scope of the present invention.

Network Update to the Handset and Fixed Operation Handset Display

The handset 10 can be instructed by the HFWI 12 to display an interfaced and operational operation status following the sensing of the interfaced and operational mode, for example upon insertion of the handset into the HFWI or bringing the handset into operating proximity to the HFWI. Although this can be achieved locally, it may be preferable to request the wireless carrier network to provide the handset with an update of this status over the air immediately after having been informed of the operation mode of the handset. This is possible, for example, using GPRS, SMS and USSD (GSM only) messaging. Such a mode of operation is foreseen as being included within the scope of the present invention.

Handset Disconnection from the HFWI

In the preferred embodiment, upon removal of the handset from operating proximity to the HFWI, the System resets the flag in the air interface signalling protocol via the data communication port 14 to its original state. Alternatively the System selects the air interface signalling protocol present in the handset that corresponds to mobile status, to indicate to the wireless carrier network, for example a PCS wireless network, that the handset has returned to a mobile mode of operation. The air interface flag returns to its original state, or the proper air interface signalling protocol with the wireless carrier network is chosen. Thus can be achieved, for example, through a software applet function that is triggered into action. This function could be triggered into action, for example, following a short measured time out due to the absence of a heartbeat or absence of local wireless connectivity [Bluetooth (trademark) bond], (or the absence of charging power) between the handset and HFWI, the handset now having been removed from the cradle or taken out of range of the HFWI.

An alternate method calls for the System to send a GPRS, SMS, USSD (GSM only) or other message which includes user information and mobile mode of operation status to a clearing house or to the wireless carrier. To send such a message, a function, preferably in the form of a software applet, is triggered into action to instruct the handset to send the message. Again, this function could be triggered into action following a short measured time out due to the absence of a heartbeat (or absence of charging power) or absence of local wireless connectivity [Bluetooth (trademark) bond] between the handset and the HFWI.

Status Update Latency

In a preferred embodiment the wireless carrier update regarding fixed or mobile status is to take place at the latest before a call is received or placed assuming the phone is on and in idle mode. A mobile phone in the off position turned on after insertion would update the network immediately upon registration. A phone inserted in the HFWI when in active mode would be considered mobile by the wireless carrier until next call out or call received. Similarly a phone removed from the HFWI when in active mode would be considered fixed until next call out or call received. The alternate method may call for greater latency in updating the wireless carrier due to transmission delays, remote authentication, etc.

Wireless Synchronisation and Voice Links

Various wireless synchronisation technologies are under development which would enable mobile devices to wirelessly synchronise themselves and exchange data and voice signals with other wired or wireless devices as long as both devices are in the same vicinity and carry a compatible synchronisation chip or protocol. The Bluetooth (trademark) and the IEEE 802.11 protocols are examples of such technologies.

Usage of such wireless protocols as an alternative to the physical (mechanical, electric or electronic interfaces) placement of a cellular handset onto a HFWI device is within the scope of the present invention.

Indeed, the handshaking relative to the operational status of the handset and HFWI device could take place within the boundaries of a local wireless local area network (LAN) or a Personal Wireless area network (PAN) to simplify handset to HFWI interoperability. The scope of the present invention includes the detection and validation of handset to HFWI operation and set up of a wireless interfaced operational connection to a wireless carrier. The detection and validation of the handset to the HFWI can occur by physical placement of the handset into a receiving cradle in the HFWI. Preferably, the detection and validation occurs by placing the handset within operating proximity to the HFWI to facilitate communication between the handset and HFWI over a wireless local communication to be established. When the detection and validation has taken place, this information is ready to be transmitted to the wireless carrier. The wireless carrier receives the information which is used to determine whether or not to offer enhanced customer features as well as providing a more cost effective use of the wireless carrier's services to the corresponding handset-HFWI combination.

Abuse Control

Users may take advantage or abuse a location based pricing scheme (e.g.: an at-home-only price plan) by unusual or unplanned use of a handset paired to and interoperating with the HFWI. This can be neutralised by various methods:

The carrier or clearing house may have inserted in its database 22 the fixed paired mode functionality at the time of subscription;

The carrier or clearing house may have available the identity or identities of the cell site or sites 18 likely to interface to the handset when it is in fixed mode of operation;

The carrier or clearing house may have available information regarding the geographical location of the handset through various location determination technologies such as triangulation and transmission or geographic data function e.g.: GPS identity of cell sites not compatible with the residential environment in question;

The carrier may obtain positive location information by cross verification of databases after identity transmission by various other means than an air interface or wireless messaging, including but not limited to cable transmission, hydro metering, etc;

Positive location identification of the handset by various means other than handset to HFWI insertion or handset to HFWI wireless proximity synchronisation or local wireless voice link is within the scope of the present invention. As a result, the wireless carrier can provide enhanced features to the handset and HFWI for use by the end user. However, these enhanced features can be controlled such that they will be made available only following an operational handshake between the handset and the HFWI.

Transmission Means

The HFWI dictates the handset (or external device) to transmit interfaced and interoperational functionality status via one of the following:

Within the content of the HFWI to handset updated signalling protocol or by choosing the appropriate signalling protocol present in the handset to be communicated regularly between handset and carrier serving systems for synchronisation;

Within the body of a SMS or GPRS transmission sent to a yyy@aaaaa.bbb type user or to another cellular address;

Within the body of a USSD transmission sent to a gateway in the carrier network;

Within a binary data transmission from a modem connected to the handset to another modem;

Within a binary data transmission via Internet if the handset allows for an Internet connection with a conventional IP address; or Via any other wireless or wired method of transmission, including over telephone wire, coax cable electrical wire, etc.

Message Waiting Passthrough

One of the functions of the HFWI is to allow conventional premises telephone equipment to operate in a complete and usual fashion while connected to an HFWI and an interfaced and operational wireless handset arranged in accordance with the invention. In conventional telephone service, one such function is to provide end users with the notification that unheard voice messages have been deposited in a remote voice mailbox.

Figure 5:
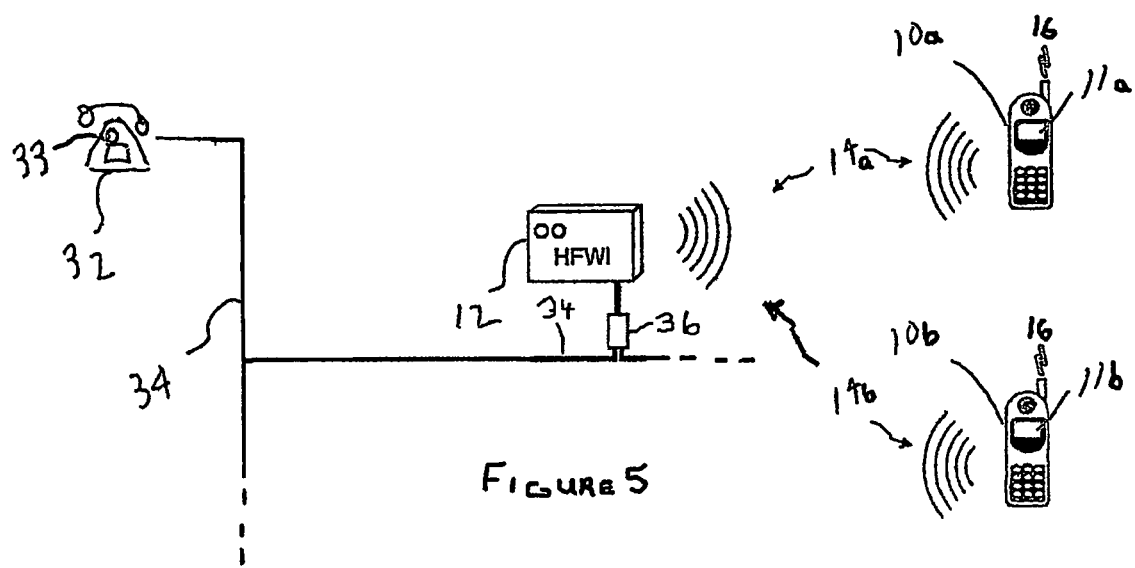
FIG. 5 is a functional block diagram of an embodiment of the invention configured with two handsets.
Figure 6:
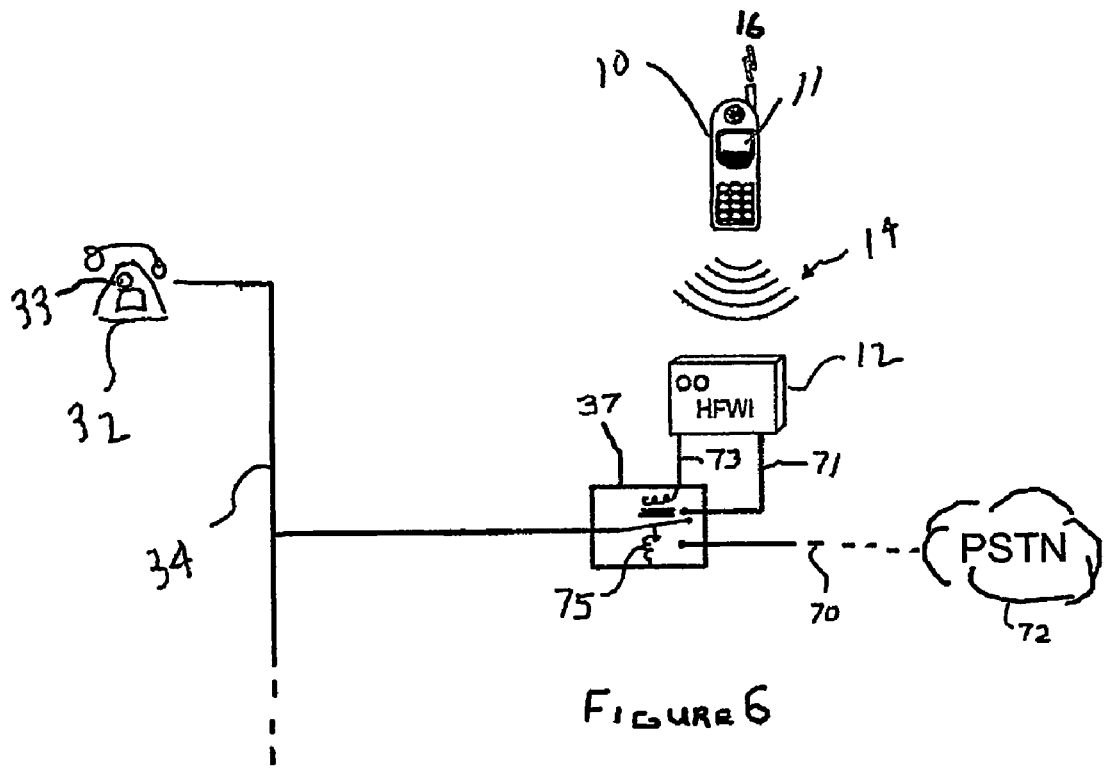
FIGS. 6 and 7 show interconnection apparatus to interconnect subscriber PSTN distribution lines and an HFWI.
Figure 7:
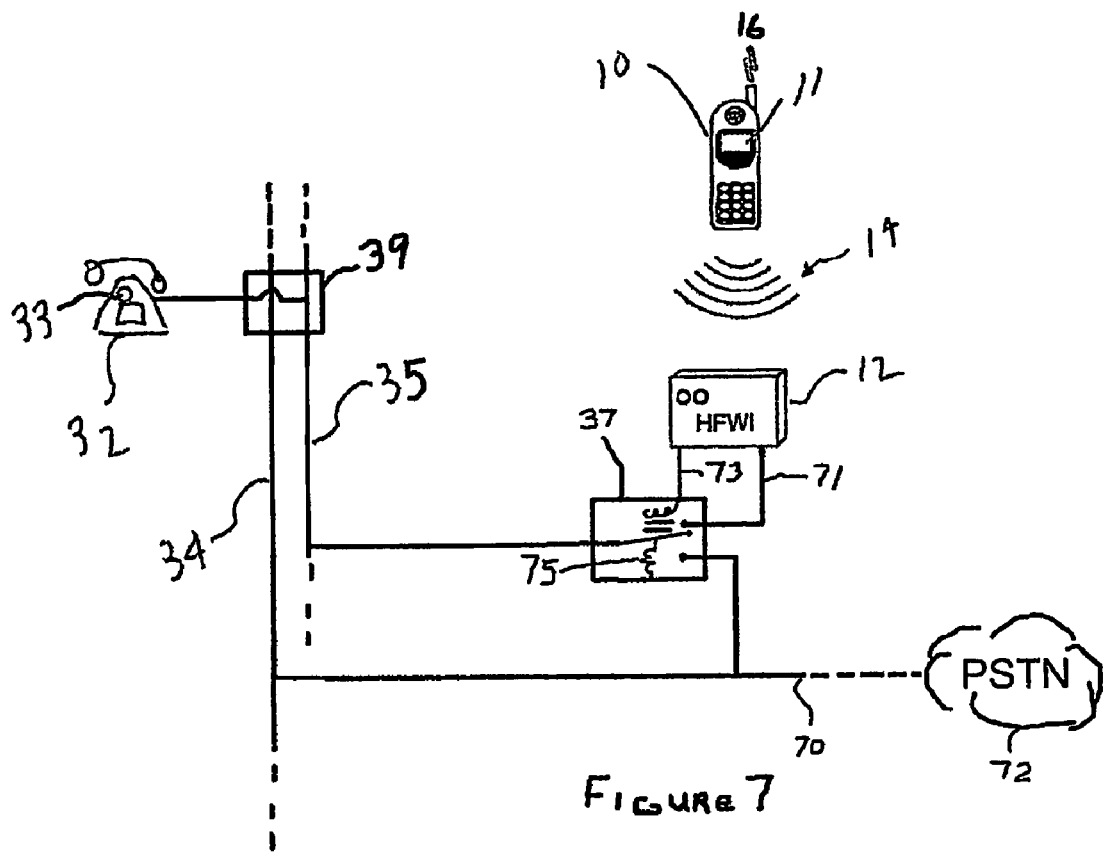

A preferred arrangement and process by which a message waiting notification provided to a cellset is gathered, processed, transformed and forwarded by the HFWI 12 to conventional wireline premises telephones 32 interfaced to the HFWI 12 is as follows:

The coupling between a handset 10 in the arrangement of FIG. 2, 6 or 7 or handsets 10a or 10b in the arrangement of FIG. 5 and the HFWI 12 includes passing message waiting status information from the wireless cellular handset 10 to each wireless premises telephone 32. The HFWI controls the operation of the premises telephone interface 30 under the control of microprocessor 24 to facilitate this forwarding of message status information. When a handset 10 is coupled to HFWI 12, the communications over the dataport 14 supports forwarding of status information, such as a message waiting indicator, which is presented to the cell phone 10 by the cellular network. A message waiting status is indicated, for example, on display 11 of the handset. This message waiting status information is communicated over dataport 14 to the HFWI to cause the HFWI to control premises telephone interface 30 to present a message waiting status information on each premises wireline telephone handset 32. In one manner of operation, an user perceptible indication of a message waiting status is provided on each premises wireline handset 32 by providing a stutter dial tone which is supplied by premises telephone interface 30 when the premises telephone handset 32 goes off hook. In another manner of operation, a user perceptible indication of a message waiting status is provided by a message waiting indicator light 33 provided on the handset of the premises telephone handset 32.

Consequently, following a coupling or a pairing of a handset 10 with the HFWI, dataport 14 supplies message waiting status information to the HFWI. Once the handset 10 is interfaced and operational with HFWI 12, the premises telephone interface 30 produces a user perceptible message waiting indication. The user perceptible message waiting indication is a stutter dial tone or an indicator light. The user perceptible message waiting indication alerts a user of the premises telephone 32 that a message is waiting. In this manner, conventional message waiting status from the wireless network 18 is passed to each premises wireline handset 32 via HFWI 12.

In accordance with this arrangement and process, the useful result is that users may now obtain, on each premises wireline handset phone 32, message waiting information present on the cellset 10.

Distinctive Ringing

Another function of the HFWI that allows conventional telephone equipment to operate in a complete and usual fashion consists of providing users with a distinctive ringing pattern to inform that a call is intended for a particular user.

A preferred arrangement and process by which a ring notification provided to a cellset 10 is gathered, processed, transformed by the HFWI 12 into a distinctive ring pattern forwarded to conventional telephones interfaced to the HFWI 12 is as follows:

Referring to FIG. 5, a pair of handsets 10*a* and 10*b* are capable of being coupled to a single HFWI 12 over a dataport 14*a* and 14*b* provided for each handset respectively. In accordance with a preferred arrangement, a wireless dataport 14 of the HFWI 12 can be bonded to multiple wireless devices, for example, handsets 10*a* and 10*b*. The dataport can communicate independently with and simultaneously with each handset 10*a* and 10*b*. Following bonding of each handset 10*a* and 10*b* to the HFWI dataport 14, microprocessor 24 (of FIG. 2) is configured to operate premises telephony interface 30 to support different ringing patterns in the ring voltage that the premises telephony interface 30 supplies to the premises distribution cabling 34. Consequently, a premises wireline telephone 32 that is connected to the premises wireline distribution cabling 34 indicates which of the handsets 10*a* or 10*b* is ringing by providing a different ringing pattern produced by premises telephone interface 30 depending on which of handsets 10*a*, 10*b* etc. that a call is received on. In this arrangement, the HFWI 12 has internal software routines that react to the ringing of each particular cellphone handset that are interfaced and operational with HFWI 12. When the handset of a wireline phone 32 is picked up to receive the call, the HFWI interconnects the voice side of the cellular handset 10*a* or 10*b* respectively with a voice path through premises telephone interface 30 to permit the premises telephone 32 to communicate over the wireless service provided on handset 10*a* or 10*b* respectively as the case may be.

In accordance with this arrangement, a conventional telephone 32 is connected to an HFWI 12 with the useful result that users may now obtain on conventional wireline telephones 32 communication access to multiple wireless handsets 10*a*, 10*b* and so on.

Alternative PSTN Access Override

FIGS. 6 and 7 show apparatus to interconnect an HFWI with conventional wireline distribution wiring at a subscriber premises. In the event that a consumer has abandoned conventional plain old telephone service, the consumer's residence premises is normally without any phone service at all. To overcome this inconvenience the wireline PSTN network 72 typically provides emergency 911 calls and 611 customer service calls on the subscriber drop loop 70. Thus, limited outbound calling on an otherwise out of service loop 70 is provided. This limited service is depicted in graphically form in FIGS. 6 and 7 by the dotted drop line 70. In the preferred arrangement of interconnection of an HFWI to premises wiring, an override relay switch 37 to connect premises telephone 33 directly to the conventional phone line 70 to permit access to the incumbent PSTN network 72. This relay switch provides an alternative to HFWI users who would need to place a call from their residence without access to a wireless handset.

In the arrangement depicted in FIG. 6, a subscriber premises is served by a single premises wireline distribution cable 34. At a PSTN network 72 demarcation point that defines a boundary between the PSTN network 72 and the subscriber distribution cabling 34, an interface relay 37 is provided. The interface relay is biased by biasing means 75 to interconnect the premises wireline distribution cabling 34 to the PSTN access line 70 by default. That is the relay 37 is normally open or normally closed, as the case may be, in the rest state of relay 37. When a cellset 10 is bonded or coupled to HFWI 12 to become interfaced and operational therewith over dataport 14, relay 37 is activated by the HFWI 12 via control line 73 to couple the premises wireline distribution cable 34 to HFWI via coupling line 71. For clarity in FIGS. 6 and 7, relay 37 and the interface lines 71, 72 are shown external to HFWQI 12, however, it is preferable to provide relay 37 and associated control lines within the HFWI 12 itself.

As a result of the configuration of relay 37 to interconnect the premises distribution wireline 34 to line 71 of the HFWI, all of the services available from the wireless network to the handset 10 via the wireless communications link 16 are made available to the premises wireline telephone 32. When the handset 10 becomes uncoupled from the HFWI 12, relay 37 is deactivated and reconnects the premises wireline distribution 34 to the PSTN drop line 70. This will provide PSTN network 72 access to the premises wireline telephones 33. If the subscribe line 70 connecting to the PSTN network 72 is out of service, there may still be emergency services such as 911 calls and 611 customer service calls available from the PSTN network 72.

FIG. 7 shows an alternate arrangement for use in subscriber premises that is provided with a two pair distribution cabling. For example, homes that have been wired for telephone service more recently are typically provided with at least two pair or two telephone lines 34 and 35 extending through the premises. In a typical arrangement, conventional phone service appears on one of the lines of the premises distribution cable 34 that appears at each of the telephone outlets within the subscriber premises. A second line or alternate pair 35 is also provided at each of the telephone outlets to facilitate two separate telephone services within the subscriber premises. Typically, the second line 35 is unused. When a subscriber has abandoned its PSTN network telephone service, the first pair 34 typically remains physically connected to the PSTN subscriber line 70. Typically subscriber line 70 remain actives to provide emergency services such as 911 calls and 611 customer services calls, even though it is out of service.

The premises second pair or distribution line 35 is usually not in use and is not connected to any PSTN drop loop or line. In accordance with the arrangement of equipment of FIG. 7, each of the premises wireless telephone handsets 32 is interconnected to the second line 34 of the premises wiring by a coupling jack 39. Coupling jack 39 couples the premises wireline telephone handset 32 to the second or unused pair or distribution cabling 35 of the premises. A relay 37 interconnects the premises second distribution cable 35 to the HFWI via line 71 or to the premises wireline distribution line 34 depending on the setting of the relay 37. In the rest or default setting of the relay 37 (that is the normally open or normally closed setting of the relay as the case may be), the secondary premises distribution line 35 is interconnected with premises primary distribution cable 34. As mentioned, the primary distribution cable 34 is likely to remain connected to the PSTN drop 70, thus each premises wireline telephone handset 32 will become interconnected to the PSTN drop 70. In the rest or default setting of relay 37, the HFWI 12 is not connected to either premises distribution line 34 or 35.

Thus in the rest or default setting of relay 37, both the primary premises distribution line 34 and the secondary premises distribution line 35 are interconnected to the inactive PSTN drop 70 to facilitate access to emergency telephone services. The interconnection coupling jack 39 couples the premises wireline handset 32 to the secondary premises distribution line 35 thus making the PSTN telephone service on loop 70 available to premises handset 32. When a wireless handset 10 is coupled to the HFWI 12 and interfaced and operational over dataport 14, relay 37 is activated by control line 73. Activating relay 37 causes it to disconnect the secondary premises distribution line 35 from the PSTN drop 70 and couple the secondary distribution line 35 to the communication line 71 of HFWI 12. In this manner, the premises wireline handset 32 is now coupled to the wireless services available over handset 10 via HFWI 12.

Receiving Means and Gateway Interface

Depending on the transmission means chosen, the receiving gateway may take the form of a USSD (HLR), SMS or GPRS server, an Internet gateway, a modem, or any other receiving means. The receiving means may also take the simple form of a modification in the carrier servers to poll or to identify upon normal polling a change in the handset identity information the handset for status information. The receiving means may be centralised outside of the carrier platform to a centralised clearing house for authentication and automatically sent to the carriers for their usage. Various scenarios can be evaluated with a view to reduce processing latency, provide for secure and accurate fixed operational or mobile status information, and interoperability with other carrier network functions.

I claim:

1. A cellphone-fed fixed/mobile interface apparatus for coupling to at least one analog-type telephone to provide the analog-type telephone at least basic analog-type telephone functions via a wireless carrier network, the apparatus comprising:

means for exchanging information about functionalities between a cellphone, the cellphone-fed fixed/mobile interface apparatus and the wireless carrier network over a connectivity dataport between the cellphone and the cellphone-fed fixed/mobile interface apparatus and over an air interface between the cellphone and the wireless carrier network;

means for validating the information about functionalities between the cellphone, the cellphone-fed fixed/mobile interface apparatus and the wireless carrier network, said validating means comprising means for authenticating service parameters available from the wireless carrier network, an identity and abilities of the cellphone, and setting parameters of the cellphone-fed fixed/mobile interface apparatus; and means for monitoring the presence of dataport connectivity between the cellphone and the cellphone-fed fixed/mobile interface apparatus, said monitoring means also comprising means for verifying the presence of the air interface and the service parameters available from the wireless carrier network; wherein when the presence of dataport connectivity between the cellphone and the cellphone-fed fixed/mobile interface apparatus is verified, the validating and monitoring means signals an interfaced operational state to repository means accessible to the wireless carrier, thus informing the wireless carrier that it should maintain the fixed-interface mode of operation for the cellphone, the cellphone-fed fixed/mobile interface apparatus and the wireless carrier network, in order to enable enhanced and conditioned billing functions and network features consistent with the signalled state.

2. The cellphone-fed fixed/mobile interface apparatus as defined in claim 1, comprising means fox providing interfaced analog telephones with a ringing signal indicative of different cellphones calling.

3. The cellphone-fed fixed/mobile interface apparatus as defined in claim 1, comprising means for operating a relay so as to allow analog telephones service passthrough in the absence of at least one cellphone feeding the fixed/mobile interface apparatus.

4. The cellphone-fed fixed/mobile interface apparatus as defined in claim 1, wherein the connectivity dataport comprises a local wireless or physical connectivity dataport linked to a microprocessor comprising memory and software means controlling said connectivity dataport.

5. The cellphone-fed fixed/mobile interface apparatus as defined in claim 4, wherein the local wireless connectivity dataport further comprises a physical connectivity dataport.

6. The apparatus of claim 1, further comprising:

instructing means for instructing the cellular handset to signal an interfaced operational state to repository means accessible to the wireless carrier thus informing wireless carrier that it should maintain the interfaced operational state or absence of interfaced operational state for the cellphone, the cellphone-fed fixed/mobile interface apparatus and the wireless carrier network, in order to enable enhanced and conditioned billing functions and network features consistent with the signaled state;

the cellular handset having a user interface display, the display functional to indicate the interfaced operational state; and receiving repository means accessible to the wireless carrier to maintain the fixed-interface mode of operation for the cellphone, the cellphone-fed fixed/mobile interface apparatus and the wireless carrier network, in order to enable enhanced and conditioned billing functions and network features consistent with the signalled state.

* * * * *